United States Patent [19]
Schutts et al.

[11] Patent Number: 6,136,476
[45] Date of Patent: Oct. 24, 2000

[54] METHODS FOR MAKING LITHIUM VANADIUM OXIDE ELECTRODE MATERIALS

[75] Inventors: Scott M. Schutts, Menomonie, Wis.; Robert J. Kinney, Woodbury, Minn.

[73] Assignees: Hydro-Quebec Corporation, Montreal, Canada; 3M Innovative Properties Company, St. Paul, Minn.

[21] Appl. No.: 09/239,287

[22] Filed: Jan. 29, 1999

[51] Int. Cl.⁷ .................................................. H01M 10/24
[52] U.S. Cl. .................................. 429/231.95; 429/231.2
[58] Field of Search ........................... 429/231.95, 231.2; 241/18

[56] References Cited

U.S. PATENT DOCUMENTS

| | | |
|---|---|---|
| 4,198,004 | 4/1980 | Albus et al. . |
| 4,897,917 | 2/1990 | Gauthier et al. . |
| 4,952,467 | 8/1990 | Buchel et al. . |
| 4,980,251 | 12/1990 | Thackeray et al. . |
| 5,013,620 | 5/1991 | Miyazaki et al. . |
| 5,039,582 | 8/1991 | Pistoia . |
| 5,153,081 | 10/1992 | Thackeray et al. . |
| 5,196,278 | 3/1993 | Idota . |
| 5,211,933 | 5/1993 | Barboux et al. . |
| 5,221,453 | 6/1993 | Crespi . |
| 5,316,752 | 5/1994 | Beggs et al. . |
| 5,334,334 | 8/1994 | Koksbang . |
| 5,415,954 | 5/1995 | Gautheir et al. . |
| 5,423,110 | 6/1995 | Gauthier et al. . |
| 5,486,346 | 1/1996 | Fey . |
| 5,520,903 | 5/1996 | Chang et al. ............................ 423/593 |
| 5,545,496 | 8/1996 | Chang et al. . |
| 5,549,880 | 8/1996 | Koksbang . |
| 5,561,006 | 10/1996 | Lecerf et al. . |
| 5,591,543 | 1/1997 | Peled et al. . |
| 5,654,114 | 8/1997 | Kubota et al. . |
| 5,674,645 | 10/1997 | Amatucci et al. ....................... 429/224 |
| 5,702,679 | 12/1997 | Sheargold et al. . |
| 5,755,985 | 5/1998 | Vallee et al. . |
| 5,780,185 | 7/1998 | Oki et al. ............................ 429/231.95 |
| 5,965,293 | 11/1999 | Idota et al. ............................ 429/218.1 |

FOREIGN PATENT DOCUMENTS

| | | |
|---|---|---|
| 394 917 A1 | 10/1990 | European Pat. Off. . |
| 397 608 A2 | 11/1990 | European Pat. Off. . |
| 462 575 A2 | 12/1991 | European Pat. Off. . |
| 806 397 A1 | 11/1997 | European Pat. Off. . |
| 1148606 | 12/1986 | Italy . |
| 2-267858 | 11/1990 | Japan . |
| 3-225757 | 10/1991 | Japan . |
| 3-228826 | 10/1991 | Japan . |
| 3-236173 | 10/1991 | Japan . |
| 4-204446 | 7/1992 | Japan . |
| 6-005286 | 1/1994 | Japan . |
| 6-076824 | 3/1994 | Japan . |
| 6-171947 | 6/1994 | Japan . |
| 9-251854 | 9/1997 | Japan . |
| 9-320591 | 12/1997 | Japan . |
| 2069182 | 11/1996 | Russian Federation . |

OTHER PUBLICATIONS

F. Bonino et al., "Electrode Kinetics in Poly(Ethylene Oxide)–Based Electrolytes", *J. Power Sources*, 20, 333–338 (1987) no month available.

F. Bonino et al., "A Polymeric Electrolyte Rechargeable Lithium Battery", *J. Electrochem.Soc.*, 135, 12–15 (1988) nA/month F. Bonino et al., "Li/LiV$_3$O$_8$ Polymer Electrolyte Rechargeable Batteries", *Solid State Ionics*, 28–30, 853–856 (1988) n/a month.

F. Bonino et al., "Rechargeable lithium batteries based on Li$_{1+x}$V$_3$O$_8$ thin films", *J. Power Sources*, 56, 193–196 (May 24, 1995).

DePicciotto, "Structural characterization of Li$_{1+x}$V$_3$O$_8$ insertion electrodes by single–crystal X–ray diffraction", *Solid State Ionics*, 62, 297–307 (Apr., 2, 1993).

P.G. Dickens et al., "Oxide Bronzes and Related Phases", *Inorganic Chemistry*, Series 2, vol. 10, pp. 211–254 (1975) n/a month.

"Finer, faster jet milling meets customer needs", *Powder & Bulk Engineering*, 96–100 (May 1998).

"Fluid Energy Grinding", Brochure of Fluid Energy Aljet, Plumsteadville, PA, 11 pages (undated).

A. Hammou et al., "All Solid State Li–Li$_{1+x}$V$_3$O$_8$ Secondary Batteries", *Electrochimica Acta*, 33, 1719–1720 (Feb. 29, 1988).

"Micro–Jet® Size Reduction Systems", Brochure of Fluid Energy Aljet, Plumsteadville, PA, 4 pgs, undated.

K. Nassau et al., "The Quenching and Electrochemical Behavior of Li$_2$O–V$_2$O$_5$ Glasses", *J. Non–Crystalline Solids*, 44, 297–304 (Oct. 7, 1980).

S. Panero et al., "Rechargeable Li/Li$_{1+x}$V$_3$O$_8$ Cells", *J. Electrochemical Society*, 130, 1225–1227 (May 1983).

M. Pasquali et al., "Li/Li$_{1+x}$ V$_3$O$_8$ Batteries V. Comparison with Other Secondary Cells and Influence of Micro–and Macro–Structural Alterations on the Cathode Performance", *J. Electrochem. Soc.*, 133, 2454–2458 (Dec. 1986).

G. Pistoia et al., "Solid Solutions Li$_{1+x}$V$_3$O$_8$ as Cathodes for High Rate Secondary Li Batteries", *Solid State Ionics*, 13, 311–318 (Jan. 1984).

(List continued on next page.)

*Primary Examiner*—Maria Nuzzolillo
*Assistant Examiner*—Monique Wills
*Attorney, Agent, or Firm*—Mueting, Raasch & Gebhardt, P.A.

[57] ABSTRACT

A method of making vanadium oxide formulations is presented. In one method of preparing lithium vanadium oxide for use as an electrode material, the method involves: admixing a particulate form of a lithium compound and a particulate form of a vanadium compound; jet milling the particulate admixture of the lithium and vanadium compounds; and heating the jet milled particulate admixture at a temperature below the melting temperature of the admixture to form lithium vanadium oxide.

35 Claims, 7 Drawing Sheets

OTHER PUBLICATIONS

G. Pistoia et al., "Li/Li$_{1+x}$V$_3$O$_8$ Secondary Batteries, Synthesis and Characterization of an Amorphous Form of the Cathode", *J. Electrochem. Soc.*, 137, 2365–2370 (Aug. 1990).

I. Raistrick, "Lithium Insertion Reactions in Tungsten and Vanadium Oxide Bronzes", *Solid State Ionics*, 9–10, 425–430 (1983) n/a month.

R. Schöllhorn et al., "Formation, Structure, and Topotactic Exchange Reactions of the Layered Hydrogen Bronze H$_x$V$_3$O$_8$", *J.C.S. Chem. Comm.*, 398–399 (1979) n/a month.

R. Tossici et al., "Study of amorphous and crystalline Li$_{1+x}$V$_3$O$_8$ by FTIR, XAS and electrochemical techniques", *Solid State Ionics*, 57, 227–234 (1992).

A. Wadsley, "Crystal Chemistry of Non–stoichiometric Pentavalent Vanadium Oxides: Crystal Structure of Li$_{1+x}$V$_3$O$_8$", *Acta Cryst.*, 10, 261–267 (1957) n/a month.

K. West, "Vanadium Oxides as Electrode Materials for Rechargeable Lithium Cells", *J. Power Sources*, 20, 165–172 (1987).

K. West et al., "Comparison of LiV$_3$O$_8$ Cathode Materials Prepared by High Temperature and Gel Synthesis", *Proceedings Electrochem. Soc.*, 286–296 (1995) n/a month.

K. West et al., "Comparison of LiV$_3$O$_8$ Cathode Materials Prepared by Different Methods", *J. Electrochem. Soc.*, 143, 820–825 (1996) n/a month.

M.S. Whittingham, "The Role of Ternary Phases in Cathode Reactions", *J. Electrochemical Society*, 123, 315–320 (Mar. 1976).

Wickham et al., "A Study of the Solid Solutions Li$_{1+x}$V$_3$O$_{8\pm\lambda}$ and the Preparation of LiVo$_3$ and Li$_3$VO$_4$", *J. Inorg. Nucl. Chem.*, 1939–1946 (1965) n/a month.

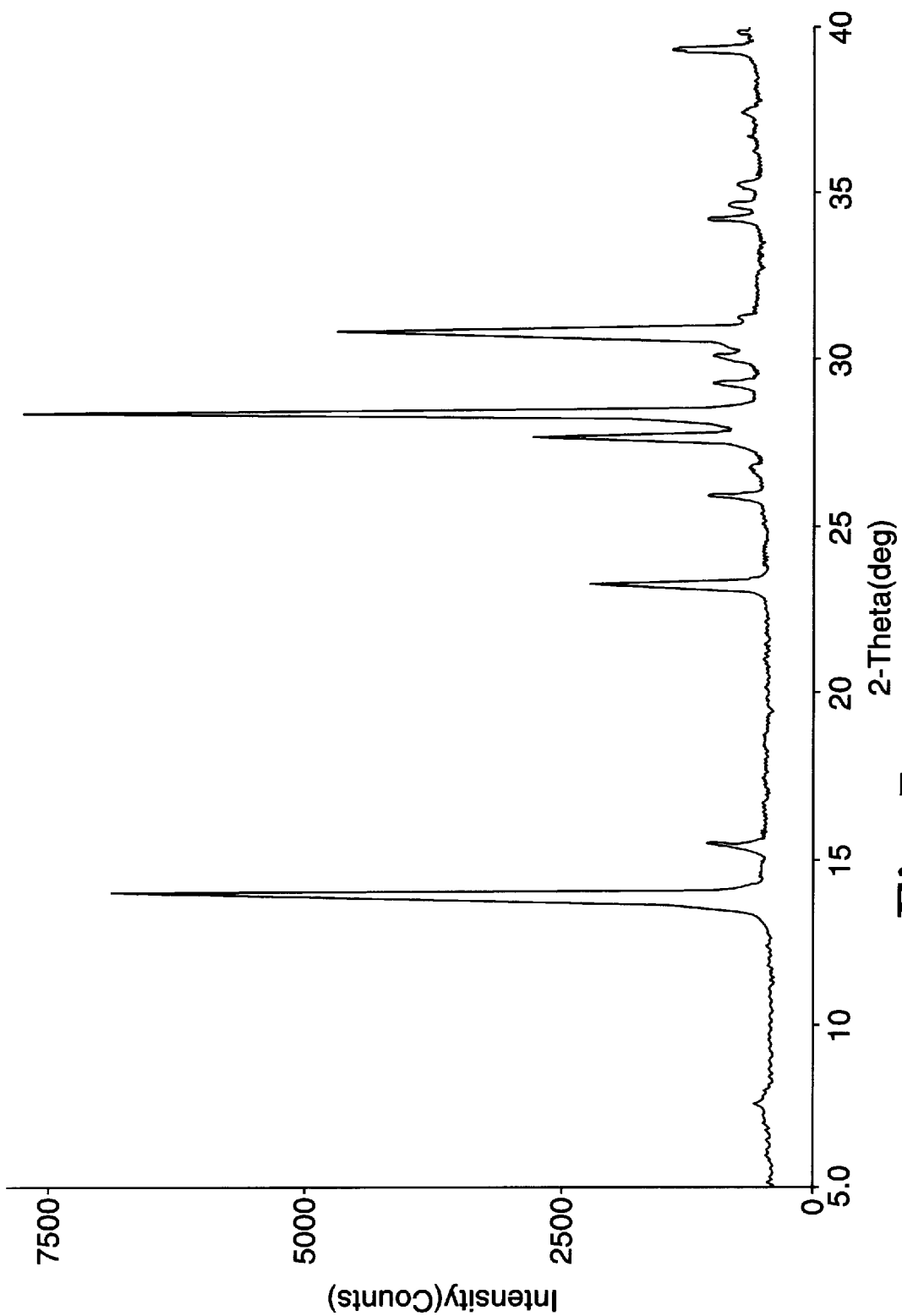

METHODS FOR MAKING LITHIUM VANADIUM OXIDE ELECTRODE MATERIALS

STATEMENT OF GOVERNMENT RIGHTS

The government of the United States of America has rights in this invention pursuant to Cooperative Agreement No. DE-FC02-91CE50336 awarded by the United States Department of Energy.

FIELD OF THE INVENTION

The present invention relates to methods for making lithium vanadium oxides, preferably of the formula $Li_xV_3O_8$, wherein x=1.0–1.5, that are used as electrode materials, for example, as cathode materials in lithium batteries.

BACKGROUND OF THE INVENTION

The negative electrode (anode) of a typical high energy lithium battery typically comprises one or more of a variety of any suitable lithium-containing substances such as metallic lithium, lithium metal alloys, or lithium metal oxides. A variety of positive electrode (cathode) materials can be used including lithium vanadium oxide. The electrodes are coupled using a liquid electrolyte or a solid electrolyte. Liquid electrolytes include nonaqueous solutions and molten salts. Solid electrolytes include ionically conducting polymers. During operation, lithium ions go into and out of the vanadium oxide structure (intercalation). More specifically, as the battery is discharged, lithium is oxidized at the anode and lithium ions move into the electrolyte and to the cathode. When the battery is charged lithium ions are reduced (plated) at the anode. This is accompanied by movement of lithium ions into the electrolyte from the cathode.

The cathode material should have a high specific capacity as well as good chemical and electrochemical stability such that it can endure many long cycling operations. The method of preparation of the cathode material can affect one or more of these characteristics. This is typically because the method of preparation affects the particle size, particle size distribution, level of crystallinity, and purity of the cathode material.

Lithium vanadium oxide can be made by a variety of methods. One such method involves mixing a lithium ion-containing compound and vanadium pentoxide and then heating the mixture to a temperature sufficient to form molten material (typically about 700° C. to about 800° C.). This molten material is then cooled to form solid lumps that are mechanically ground into a powder. These lumps can be very difficult to grind to a material of suitable particle size and particle size distribution. Special handling procedures are also typically required for such melt processes. Furthermore, the molten lithium vanadium oxide can react with the container and contaminate the product.

Nonmolten methods have been developed in an attempt to avoid the problems associated with molten methods. Many involve the use of liquids (e.g., solvents). For example, U.S. Pat. No. 5,039,582 (Pistoia) discloses a method for making amorphous lithium vanadium oxide from lithium hydroxide and vanadium pentoxide in water. This reaction is carried out at room temperature or with moderate heating. The product is collected by precipitation and then dried at 100° C. to 200° C. Although this patent describes the product as a very fine precipitate, many methods that use lithium hydroxide in water produce a gel that is difficult to filter, dry, and grind. To solve this problem, U.S. Pat. No. 5,549,880 (Koksbang) discloses a process that involves dispersing lithium hydroxide in an alcohol to form a lithium alkoxide. Vanadium pentoxide is then added and the mixture heated to form a precipitate, which is in the form of a fine powder. Yet another solvent based method is disclosed by Hammou et al., *Electrochimica Acta*, 13, 1719 (1988). This method uses an organic liquid, such as n-hexane, to ball mill a mixture of lithium carbonate and vanadium pentoxide powders. A solid state reaction is then carried out by heating this mixture at 590° C. in air. It is generally undesirable to use organic liquids, and even water, however, because such methods typically require filtering, drying, and post-particle size reduction.

Dry solid state methods (i.e., those that do not involve the use of liquids) have been developed in an attempt to avoid the problems associated with methods that include the use of liquids, particularly organic liquids. For example, U.S. Pat. No. 5,520,903 (Chang et al.) discloses a method that involves combining particles of a lithium compound, such as lithium carbonate or hydroxide, and a vanadium compound, such as vanadium pentoxide, and compacting the mixture to a densified body. The densified body, which has a density of at least 50% of theoretical, is heated to below the melting point (typically no greater than about 600° C.) to cause conversion to lithium vanadium oxide. It is disclosed that a minimum temperature of about 570° C. is needed to achieve acceptable results. As with molten material, this densified material can be very difficult to grind to a material of suitable particle size and particle size distribution.

Lithium vanadium oxide has also been made in a solid state reaction by heating reactants in the form of free flowing particulate material at a temperature slightly below their melting points. However, upon heating to temperatures of about 550° C. to 630° C., for example, the free flowing particulate material can agglomerate and form clumps as a result of melt adhesion. JP 6-171947 (Mitsui Toatsu Chemicals, Inc.) discloses a method that solves this problem by heating the reactants in a rotating drum.

Many other methods for forming lithium vanadium oxide, as well as electrodes containing such material, involve multistep mixing, milling, and/or grinding techniques. These multistep processes are not generally desirable for large-scale manufacturing, however. Thus, what is needed is an improved method of making lithium vanadium oxide suitable for use in electrodes, for example, in cathodes of lithium batteries. Also, what is needed is an improved method of making cathodes that include lithium vanadium oxide.

SUMMARY OF THE INVENTION

The present invention provides improved methods of making lithium vanadium oxide and electrode (cathode) material containing lithium vanadium oxide. These methods provide significant advantage, particularly for the large-scale manufacturing of such materials. They generally involve fewer steps than conventional methods, which cuts down on manufacturing time and costs. They also generally provide electrode materials of more uniform particle size, which leads to better battery performance.

In one embodiment, the present invention provides a method of preparing lithium vanadium oxide for use as an electrode material that involves jet milling. Specifically, this method includes: admixing a particulate form of a lithium compound (preferably, one or more lithium salts) and a particulate form of a vanadium compound (preferably, one or more vanadium oxides); jet milling the particulate admixture of the lithium and vanadium compounds; and heating the jet milled particulate admixture at a temperature below the melting temperature of the admixture to form lithium vanadium oxide. Preferably, the step of jet milling reduces the particle size of the particulate admixture. The steps of admixing and jet milling preferably occur in one step such that the reactants (i.e., the lithium and vanadium compounds) are added to the jet mill without preblending and intimately mixed therein. Preferably, the lithium compound(s) and vanadium compound(s) are admixed in a molar ratio of lithium to vanadium of about 1.0:3.0 to about 1.5:3.0. The resultant lithium vanadium oxide is preferably of the formula $Li_xV_3O_8$, wherein x=1.0–1.5, more preferably, x=1.0–1.2, and most preferably, x=1.2. Significantly, and advantageously, the methods of the present invention can form single-phase lithium vanadium oxide. That is, they can form lithium vanadium oxide in a substantially pure state without subsequent purification steps.

Preferably, the heating step is carried out at a temperature of no greater than about 630° C., and more preferably, at a temperature of no greater than about 550° C. Preferably, this heating step is carried out under conditions (e.g., temperature, time, ratio of reactants, and atmosphere) sufficient to form substantially single-phase lithium vanadium oxide. Typically, this occurs in no more than about 24 hours. Preferably, the heating step takes place in an oxidizing atmosphere.

The present invention also provides a method of preparing lithium vanadium oxide for use as an electrode material that involves flash calcining. Specifically, this method includes: admixing a particulate form of a lithium compound and a particulate form of a vanadium compound; and heating the particulate admixture in a flash calciner, preferably to a temperature below the melting temperature of the admixture to form lithium vanadium oxide. Preferably, the particulate admixture is jet milled prior to flash calcining. More preferably, the step of admixing involves admixing in a jet mill such that the reactants are added to a jet mill without preblending and intimately mixed therein.

The present invention also provides a method of making an electrochemical cell that involves jet milling lithium vanadium oxide with an electronically conductive material. Specifically, this method includes preparing a cathode that includes: providing lithium vanadium oxide; admixing the lithium vanadium oxide in particulate form with a particulate form of an electronically conductive material; jet milling the particulate admixture of lithium vanadium oxide and electronically conductive material; combining the jet milled particulate admixture with a binder and forming a cathode; and combining the cathode with an electrolyte and an anode comprising a lithium-containing material to form an electrochemical cell. Preferably, the step of providing lithium vanadium oxide involves: admixing a particulate form of a lithium compound and a particulate form of a vanadium compound; and heating the particulate admixture of lithium and vanadium compounds for a time and at a temperature effective to form lithium vanadium oxide. Preferably, this involves a step of jet milling the particulate admixture of lithium and vanadium compounds prior to the step of heating. In the electrochemical cell, preferably, the electrolyte is a solid electrolyte, such as an ionically conducting polymer, the electronically conductive material is carbon black, and the anode comprises a lithium-containing material selected from the group of metallic lithium, lithium metal alloys, and lithium metal oxides.

BRIEF DESCRIPTION OF THE DRAWINGS

FIG. 7 is an XRD pattern of lithium vanadium oxide made according to a method of the present invention.

DETAILED DESCRIPTION $LiV_3O_8$ Electrode Materials

Figure 1:
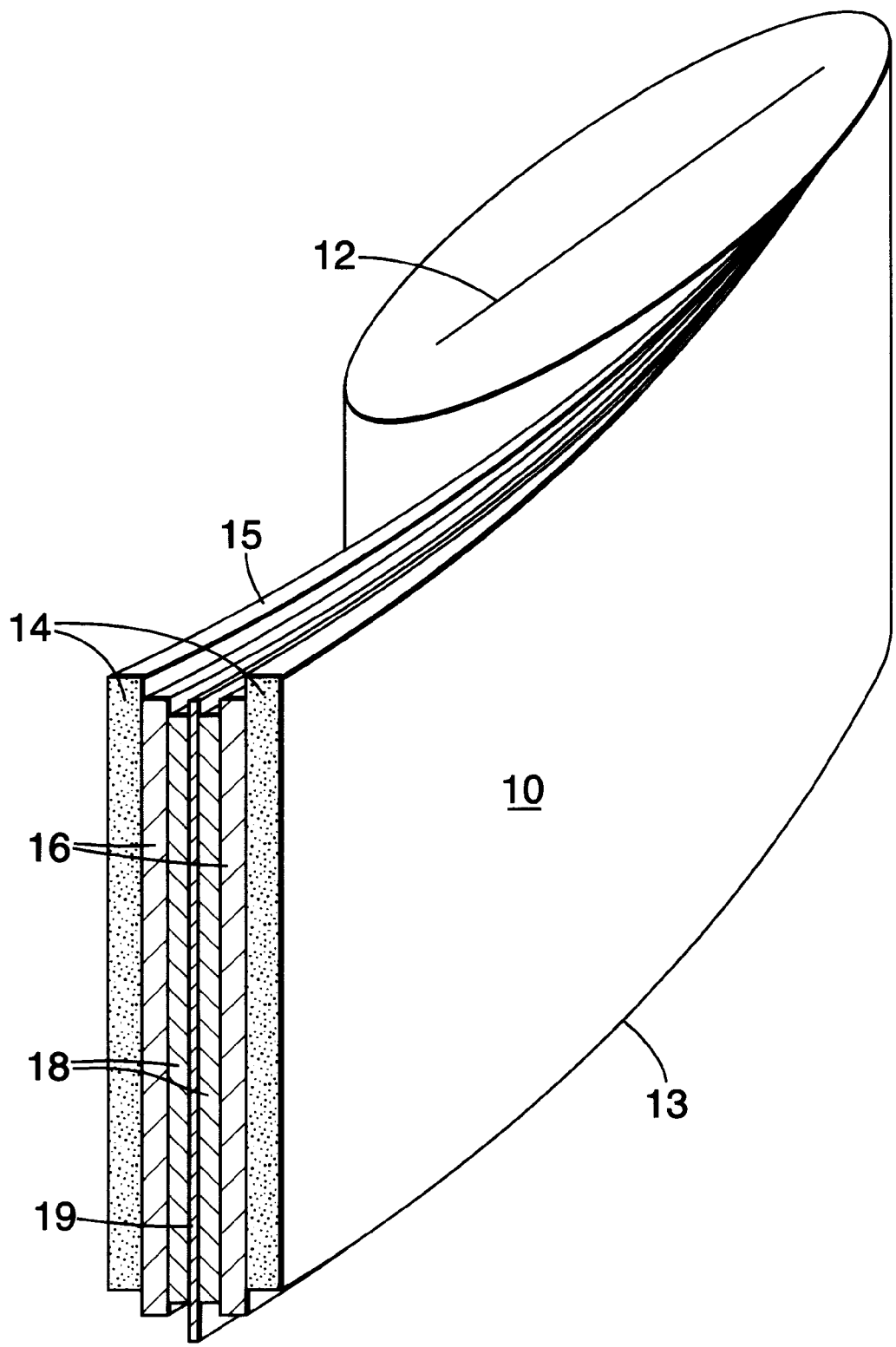
FIG. 1 is a schematic of an electrochemical cell.

A preferred vanadium oxide electrode material for use with respect to lithium batteries of concern to the present invention is referred to herein generally as lithium vanadium oxide, which has a "nominal" or "base" formula of $LiV_3O_8$. Preferably, this includes lithium vanadium oxides of the specific formula of $Li_xV_3O_8$, wherein x=1.0–1.5, more preferably 1.0–1.2, and most preferably 1.2. The crystalline structure of this material is relatively stable, and preferential, with respect to intercalation. It is typically calculated based upon the relative amounts of starting materials used during formulation of the oxide.

The specific stoichiometry preferred for the most stable electrode is $Li_{1.2}V_3O_8$, again based upon relative amounts of materials used during formulation. In general, the crystalline structure of $Li_{1.2}V_3O_8$ is tetrahedral with the vanadium and lithium ions occupying octahedral sites.

Lithium vanadium oxide products can be characterized in various ways, such as by standard chemical and spectroscopic methods to give the Li/V ratio and the V oxidation number. One of the most useful analytical methods for characterization of these materials is x-ray diffraction (XRD), using powder techniques. A well-defined XRD pattern can show whether or not a single-phase product is obtained.

Methods of Preparation of $Li_xV_3O_8$

The present invention provides methods of synthesizing a lithium vanadium oxide. Preferably, these methods do not involve the use of liquids. Significantly, preferred methods involve the use of a jet milling technique at one or more stages. Jet milling is advantageous because it is continuous and intimately mixes the starting materials as dry, free-flowing materials. Following this, heating the jet milled material allows these compounds to react in the solid state to form chemically pure and phase pure lithium vanadium oxide. The use of jet milling also provides a controlled particle size and a relatively narrow particle size distribution.

A jet mill is a device that utilizes high velocity streams of gas for pulverizing materials to extremely fine particle sizes. High-pressure gas (usually air or steam, although other gases such as nitrogen, argon, carbon dioxide, etc. can be used) is introduced into a chamber through nozzles that form grinding streams of sonic or supersonic velocity. The starting materials are entrained in the turbulent flow of gas, causing them to collide. These high-velocity collisions pulverize the solids into micron and submicron particle sizes. As the particles are reduced to the desired size, they are discharged from the mill. Such jet mills are described, for example, in U.S. Pat. No. 4,198,004 (Albus et al.) and are commercially available from, for example, Fluid Energy Aljet, Plumsteadville, Pa.

A preferred jet mill is of the pancake type, which is available under the trade designation MICRO-JET (Model 8) from Fluid Energy Aljet. In this mill, the starting material is ground and classified in a single circular grinding chamber. In operation, the starting material is metered into the chamber through a feed funnel and venturi-eductor. One or more starting materials can be fed into the chamber either individually or preblended. Jet nozzles are aligned around the chamber's periphery to produce high-velocity compressed-gas jet pulses that create a vortex. The tangential angle of the jet flow causes the particles to rotate, subjecting them to continuous particle-on-particle impact and reduction. Centrifugal force retains larger particles in the grinding area while centripetal force drags the finer particles toward the center, where they discharge through an outlet tube for collection in a process baghouse.

Jet milling is typically used in grinding and classifying particles. For example, JP 6-5286 (Honda Motor Co., Ltd.) teaches alternating jet milling and ball milling for grinding and sizing vanadium pentoxide particles. Seldom is jet milling used for forming an intimate mixture of materials. U.S. Pat. No. 5,702,679 (Sheargold et al.) discloses the use of jet milling, along with a number of other mixing techniques (e.g., rotating drum mixing, vibratory milling, ball milling), to intimately mix compounds to form lithium manganese oxides. However, this document does not necessarily teach that jet milling is any better than any other mixing technique or has any significant advantages for mixing starting materials before heating and reacting them. Furthermore, seldom are starting materials introduced into a jet mill without initially preblending when the stoichiometry of the product is important. This is because it can be very difficult to control the relative amounts of the starting materials for the appropriate stoichiometry of the product.

The methods of synthesizing a lithium vanadium oxide include forming a mixture in particulate form of at least one lithium compound and at least one vanadium compound. Although upon mixing, these compounds may become somewhat agglomerated due to the presence of water from initial reaction, a particulate admixture as used herein refers to noncompressed particulate material. Preferably, such particulate admixtures include relatively dry, free-flowing solid particles. The methods of the present invention subsequently include heating the mixture to cause these compounds to react with each other by simultaneous decomposition to form the lithium vanadium oxide described above. Preferably, the mixture (admixture) of particulate material is jet milled prior to being heated. Typically, and preferably, this jet milling step reduces the particle size as well as the particle size distribution of the particulate material, thereby classifying the material and forming a relatively homogenous material. More preferably, the steps of mixing (admixing) and jet milling occur substantially simultaneously (i.e., in one step). That is, the jet mill is used to intimately mix the reactants without preblending them. In this way, the reactants can be combined, intimately mixed, ground into smaller particles, and classified to form a material having a relatively homogenous particle size distribution in one step.

The lithium and vanadium compounds can include salts and oxides, which may include coordinated molecules of water (referred to as hydrated compounds). The lithium compound is preferably selected from the group of lithium oxide, lithium hydroxide (LiOH, preferably hydrated), lithium carbonate ($Li_2CO_3$), lithium nitrate ($LiNO_3$), lithium acetate, lithium stearate, lithium formate, lithium oxalate, lithium citrate, lithium lactate, lithium tartrate, lithium pyruvate, and mixtures thereof. More preferably, the lithium compound is a salt, which is preferably lithium hydroxide, lithium carbonate, or mixtures thereof. Most preferably, it is lithium hydroxide.

The vanadium compound is preferably selected from the group of vanadium pentoxide ($V_2O_5$), vanadium tetroxide ($V_2O_4$) vanadium trioxide ($V_2O_3$), ammonium metavanadate ($NH_4VO_3$), and mixtures thereof. More preferably, the vanadium compound comprises vanadium in the +5 oxidation state, which is preferably vanadium pentoxide, ammonium metavanadate, or mixtures thereof. Most preferably, it is vanadium pentoxide.

The compounds are preferably mixed in a stoichiometric ratio so that there is at least an approximate molar ratio of Li:V of 1:3, preferably with a molar ratio of lithium to vanadium of about 1.0:3.0 to about 1.5:3.0.

Generally, the starting materials (i.e., reactants) can be intimately mixed by a variety of mixing techniques. For example, mixers such as rotating drum mixers, vibratory mills, jet mills, ball mills, or the like, can be used, so long as the compounds are sufficiently intimately mixed. Preferably, however, the starting materials are intimately mixed using a jet mill for the reasons discussed above. Optionally, the jet milling occurs after combining and preblending the reactants for better control of the stoichiometry of the product.

Typically, the starting materials are fed into the jet mill at a rate of no greater than about 15 kilograms per hour (kg/hr), and preferably, no greater than about 10 kg/hr, at 100 standard cubic feet per minute (scfm) gas. For preferred particle size, the high pressure gas is fed into the jet mill at a pressure of at least about 80 pounds per square inch (psi) (0.55 MPa). Lower pressures typically provide larger particle sizes and poorer mixing. Typically, the gas is pressurized to no more than about 120 psi (0.83 MPa), although higher pressures can be used if desired. Also, if desired, the gas can be preheated, for example, to temperatures up to about 120° C.

The intimately mixed compounds (herein referred to as the "particulate admixture" or "precursor") are then heated to convert the lithium and vanadium compounds to lithium vanadium oxide. Typically, this occurs in a separate reactor from that of the mixer (e.g., jet mill mixer), although it is envisioned that the same equipment can be used for mixing and heating. The reactor can be any of a variety of reactors such as a rotary kiln, flash calcining furnace, packing type calcining furnace, fluidized calcining furnace, tunnel furnace, shuttle furnace, and the like. The choice of reactor type will be dependent upon the other process parameters and the compounds used. Preferably, a flash calcining furnace (i.e., flash calciner) is used.

The heating step typically includes calcining. Calcining involves heating a substance to a high temperature but below the melting point or fusion point, causing loss of moisture and conversion to the desired product. Preferably, there is little or no fusion of free-flowing particulate material during calcining, although some agglomeration may occur. A preferred process for carrying out the converting of the lithium and vanadium compounds is flash calcining. Flash calcining is a continuous process that generates free-flowing powder that typically does not require post processing to reduce particle size or break up agglomerates.

Flash calcining the precursor, particularly the jet milled precursor (particulate admixture), is advantageous due to the low resonance time and reduced agglomeration of the particles, which in turn, increases throughput and eliminates post milling of the material, compared to other calcining methods. The turbulent environment in the calcining chamber provides instant and uniform heating of particles, yielding a fine free-flowing calcined oxide powder with few, if any, agglomerates.

Commercial flash calciners are available from, for example, Fluid Energy Aljet (Plumsteadville, Pa.) under the trade designation THERMAJET. Low pressure air, steam or other gases such as nitrogen, argon, carbon dioxide, etc., is heated and introduced into a manifold. Nozzle locations, sizes and angles are engineered to develop a controlled evaporative circuit. Heating and deagglomeration begin as the feed enters this high velocity gas circuit in the heating chamber. The turbulent flow maximizes inter-particle collisions and deagglomeration. The continually increased surface area reduces heating time and protects particles from overheating. The material is conveyed into a separate classification zone, where properly sized product is removed by the frictional drag of the exiting gases. Heavier, moist particles are recycled to the heating chamber.

The admixture of particulate material is preferably heated to a temperature and for a time effective to form the desired lithium vanadium oxide, preferably, substantially single-phase lithium vanadium oxide. Preferably, this involves a temperature of no greater than about 630° C., and more preferably, no greater than about 550° C. Preferably, this involves a temperature of at least about 350° C., and more preferably, at least about 400° C.

The mixture is typically held at the desired temperature for a period of at least about 3 hours, and generally for no greater than about 24 hours. The temperature can be increased continuously or in stages, depending on the starting materials. For example, the rate at which the temperature for starting materials that include vanadium pentoxide can be as fast as the equipment allows. However, for starting materials that include ammonium metavanadate, the temperature is increased to about 200° C. to about 300° C. and held for a period of time (e.g., about 7 hours) to control the initial exothermic reaction, and then increased to the final temperature. The temperature profile can be readily determined by one of skill in the art. The heating of the mixture advantageously is in an oxidizing atmosphere, such as air, oxygen, or an oxygen enriched atmosphere.

Optionally, the particulate admixture can be agitated during the heating process, as occurs in a flash calciner. The fluidizing motion allows for rapid heat transport and provides continuously renewed gas/surface interface exposure. It is this combination of conditions that allows the reaction kinetics of the process to be greatly enhanced compared to that of a static bed process. The heating step is typically followed by a cooling step by quenching in air or cooling at the natural furnace cooling rate.

Preferably, the calcined material (lithium vanadium oxide), which has preferably been jet milled before heating, typically has a mean particle size of no greater than about 10 microns (i.e., micrometers). These particle sizes preferably are obtained without subsequent grinding. Although the particles may be agglomerated, the agglomerates can be readily separated into individual particles, particularly with subsequent jet milling if desired. Material having a mean particle size of no greater than about 1 micron is also possible and particularly preferred. Although this mean particle size can be obtained in a variety of manners, preferably, it can be obtained by subjecting jet milled, calcined material to a subsequent jet milling operation. Such preferred material typically has a particle size distribution having an upper level of no greater than about 10 microns, and more preferably, no greater than about 6 microns.

Methods of Preparation of Electrochemical Cells

The present invention also provides methods of forming an electrochemical cell, which includes a lithium vanadium oxide cathode. Preferably, these methods do not involve the use of liquids (e.g., organic solvents such as heptane), although conventional liquid methods can be used with lithium vanadium oxide that has been made using a jet mill and/or flash calciner. The lithium vanadium oxide is typically combined with an electronically conductive material. Preferably, this occurs in a jet mill using the same conditions described above for the preparation of the lithium vanadium oxide. Jet milling is advantageous because it is a continuous method that requires no solvent or subsequent solvent removal. Furthermore, jet milling can be used to break up any agglomerates formed in previous steps.

The electronically conductive material is preferably carbon black although acetylene black or graphite can be used. Typically, about 2 wt-% to about 25 wt-% or even up to 40 wt-% conductive material is used.

This admixture of lithium vanadium oxide and conductive material is then preferably dried sufficiently for effective performance as a cathode in an electrochemical cell. Typically, this involves a temperature of about 110° C. to about 140° C., a pressure of about 20 mm Hg (27 kPa) to about 30 mm Hg (40 kPa) for about 12 hours to about 48 hours.

The mixture, preferably after it has been dried, is then combined with a binder, and optionally a lithium salt, to form a cathode. A wide variety of suitable binders can be used, including, for example, polymer binders such as polyethylene oxide and ethylene oxide copolymers as described in U.S. Pat. No. 5,755,985 (Vallee et al.), or other known polymers. Typically, this mixture of lithium vanadium oxide, conductive material, and binder, in a suitable solvent, e.g., acetonitrile, is spread onto a conductive backing, such as carbon coated aluminum foil, and then dried, typically by heating in a dry gas stream. These electrodes are then incorporated into an electrochemical cell using materials and methods well known to one of skill in the art.

An electrochemical cell includes a negative electrode (anode) typically comprising one or more of a variety of suitable lithium-containing substances such as metallic lithium, lithium metal alloys, or lithium metal oxides. The positive electrode (cathode) material described above is coupled with the anode using a liquid electrolyte or a solid electrolyte. Liquid electrolytes typically include nonaqueous solutions and molten salts. Solid electrolytes typically include ionically conducting polymers.

An example of a specific electrochemical cell which is employed as the basic energy producing element of an energy storing device may have a thin-film prismatic structure such as that illustrated in FIG. 1. In accordance with the embodiment illustrated in FIG. 1, the electrochemical cell 10 is shown as having a flat wound prismatic configuration in which a thin-film solid electrolyte 16 is disposed between a film 14 constituting an anode and a film 18 constituting a cathode. A central cathode current collector 19 is disposed between each of the cathode films 18 to form a bi-face cell configuration. A mono-face cell configuration may alternatively be employed in which a single cathode collector 19 is associated with a single anode/separator/cathode element combination. In this configuration, an insulating film is typically disposed between individual anode/separator/cathode/collector element combinations. The anode films 14 are laterally offset relative to the cathode current collector 19 so as to expose the anode 14 along a first edge 15 of the cell 10, and to expose the cathode current collector 19 along a second edge 13 of the cell 10. The embodiment shown in FIG. 1 includes a force producing core element 12 about which the thin-film electrochemical cell 10 is wound.

The electrochemical cell 10 shown in FIG. 1 may include a solid polymer electrolyte 16 which constitutes an ion transporting membrane, a lithium metal anode 14, and a vanadium oxide cathode 18. These film elements are fabricated to form a thin-film laminated prismatic structure, which may also include an insulation film, such as polypropylene film.

In general, the active materials constituting the solid-state, thin-film electrochemical cell illustrated in FIG. 1 retain chemical and mechanical integrity at temperatures well beyond typical operating temperatures. For example, temperatures of up to 180° C. may be tolerated. The electrochemical cells depicted generally in the figures may be fabricated in accordance with the methodologies disclosed in U.S. Pat. No. 5,423,110 (Gauthier et al.), U.S. Pat. No. 5,415,954 (Gauthier et al.), and U.S. Pat. No. 4,897,917 (Gauthier et al.).

EXPERIMENTAL EXAMPLES

Objects and advantages of this invention are further illustrated by the following examples, but the particular materials and amounts thereof recited in these examples, as well as other conditions and details, should not be construed to unduly limit this invention.

Example 1

Two kilograms of high purity vanadium pentoxide (Kerr-McGee, Oklahoma City, Okla.) and 368 grams of lithium hydroxide monohydrate (FMC, Gastonia, N.C.) were placed in an eight quart PK BLENDMASTER TWIN SHELL lab blender with high speed intensifier bar (Patterson-Kelley Co., Stroudsburg, Pa.) and blended for ten minutes. This blended material was then fed into a Fluid Energy Model 8 MICRO-JET jet mill (Fluid Energy Aljet, Plumsteadville, Pa.) at two kilograms per hour through a dry powder feeder. The pressure for the manifold and pusher nozzle was set at 120 psi (0.83 MPa). The output material was collected in a filter bag house. Four kilograms of the output from the jet mill was heated in a Blue M oven (Model CW-7780G-MP, Lindberg/Blue M, Ashville, N.C.), in ambient atmosphere from 25° C. to 450° C. at 5 degrees per minute and then kept at 450° C. for seven hours. The material was cooled to room temperature.

Figure 2:
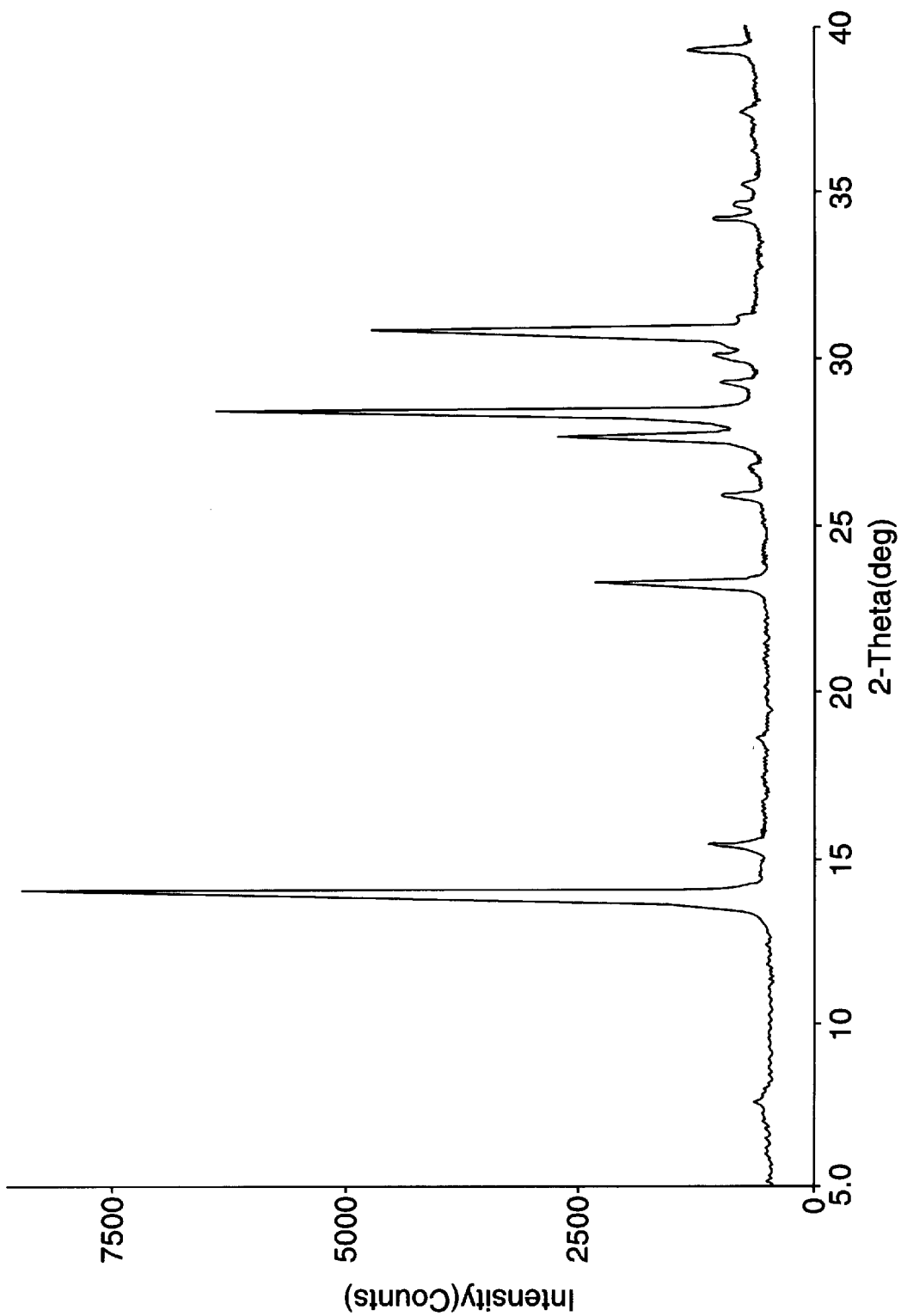
FIG. 2 is an XRD pattern of lithium vanadium oxide made according to a method of the present invention.

The material was characterized by x-ray powder diffraction (XRD), the results of which are shown in FIG. 2. The XRD was recorded using copper $K_\alpha$ radiation for 2-theta from 5 degrees to 40 degrees in steps of 0.04 degree and a preset time of 4 seconds on a Rigaku MINIFLEX PLUS (Rigaku Corp., Tokyo, JP). The diffraction pattern is consistent with reference diffraction patterns for $Li_xV_3O_8$, wherein x=1.2, as shown in Wickham et al., *Inorg. Nucl. Chem.*, 27, 1939–1946 (1965) and DePicciotto, *Solid State Ionics*, 62, 297–307 (1993). The diffraction pattern does not contain any peaks from the starting material $V_2O_5$ or other vanadium oxide phases.

A sample of 1940 grams of $Li_xV_3O_8$ prepared by the above method and sixty grams of KETJENBLACK EC600JD carbon black (Akzo Nobel, Chicago, Ill.) were blended for ten minutes in the eight quart PK blender described above. This blend was fed into the same jet mill utilizing the same conditions as described above. The milled mixture of carbon and $Li_xV_3O_8$ was dried under a vacuum of 30 mm Hg (40 kPa) for 24 hours at 120° C. under helium purge.

The particle size distribution was measured of this blend with a Horiba LA-910 Laser scattering particle size distribution analyzer (Horiba, Irvine, Calif.). The samples were prepared in methanol with thirty seconds of ultrasonic treatments. Particle size distribution measurements were made by circulating the sample using a standard distribution form and reported as an average of ten measurements. The results are shown in Table 1.

This blend of carbon and $Li_xV_3O_8$ was used in a test battery as described under CELL PREPARATION AND CYCLING. The $Li_xV_3O_8$ prepared in this example provided 265 mAh/gram.

Example 2

Figure 3:
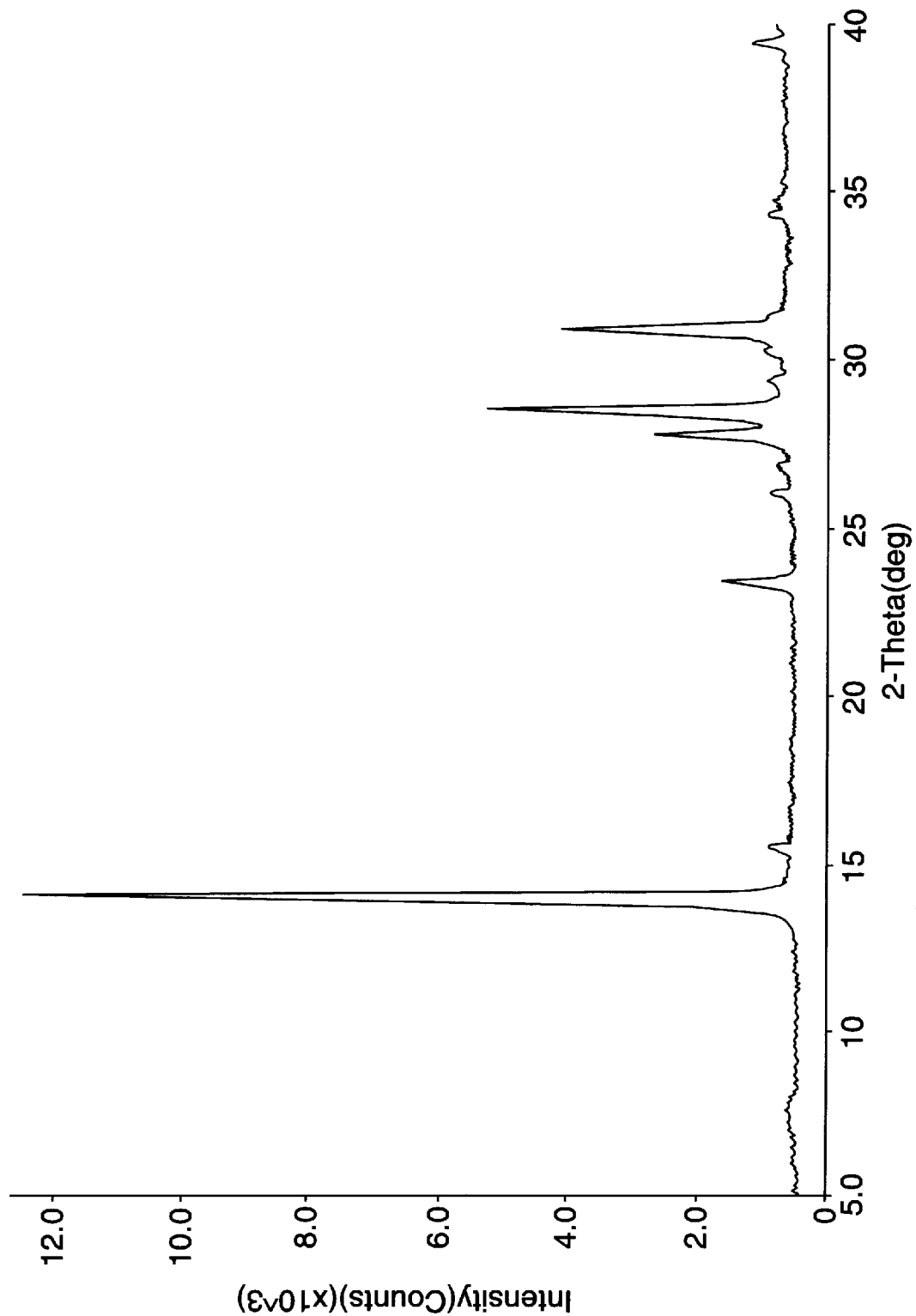
FIG. 3 is an XRD pattern of lithium vanadium oxide made according to a method of the present invention.

This example demonstrates the use of ammonium metavanadate in place of $V_2O_5$. A sample of 8356 grams of ammonium metavanadate (Kerr-McGee) and 1224 grams of lithium hydroxide monohydrate (FMC) were added to a sixteen quart PK blender, and blended for 10 minutes. This material was then fed through the jet mill, as in Example 1, except that the manifold and pusher nozzle settings were 110 psi (0.76 MPa). A sample of 4000 grams of the jet milled material was heated in the Blue M oven described in Example 1, under ambient atmosphere, from 25° C. to 275° C. at 1° C./minute, kept at 275° C. for eight hours, heated from 275° C. to 450° C. at 2° C./minute, and kept at 450° C. for eight hours. After cooling, a portion of this material was removed for analysis by XRD. These results are shown in FIG. 3. The x-ray diffraction spectra contains peaks attributed only to $Li_xV_3O_8$, wherein x=1.2, consistent with reference XRDs.

A sample of 1880 grams of the $Li_xV_3O_8$ and 120 grams of KETJENBLACK EC600JD carbon black (Akzo Nobel) were then blended for 10 minutes in the eight quart lab PK blender referenced in Example 1. This mixture was fed into the jet mill under the same conditions as above in this example. The milled mixture of carbon and $Li_xV_3O_8$ was dried under a vacuum of 30 mm Hg (40 kPa) for 24 hours at 120° C. under helium purge. A sample of the lithium vanadium oxide that was subjected to a second jet milling step was evaluated with respect to particle size without the carbon. This blend was then used to produce and test a battery lab cell according to the procedure outlined under CELL PREPARATION AND CYCLING. The $Li_xV_3O_8$ prepared in this example provided 284 mAh/gram.

Example 3

Figure 4:
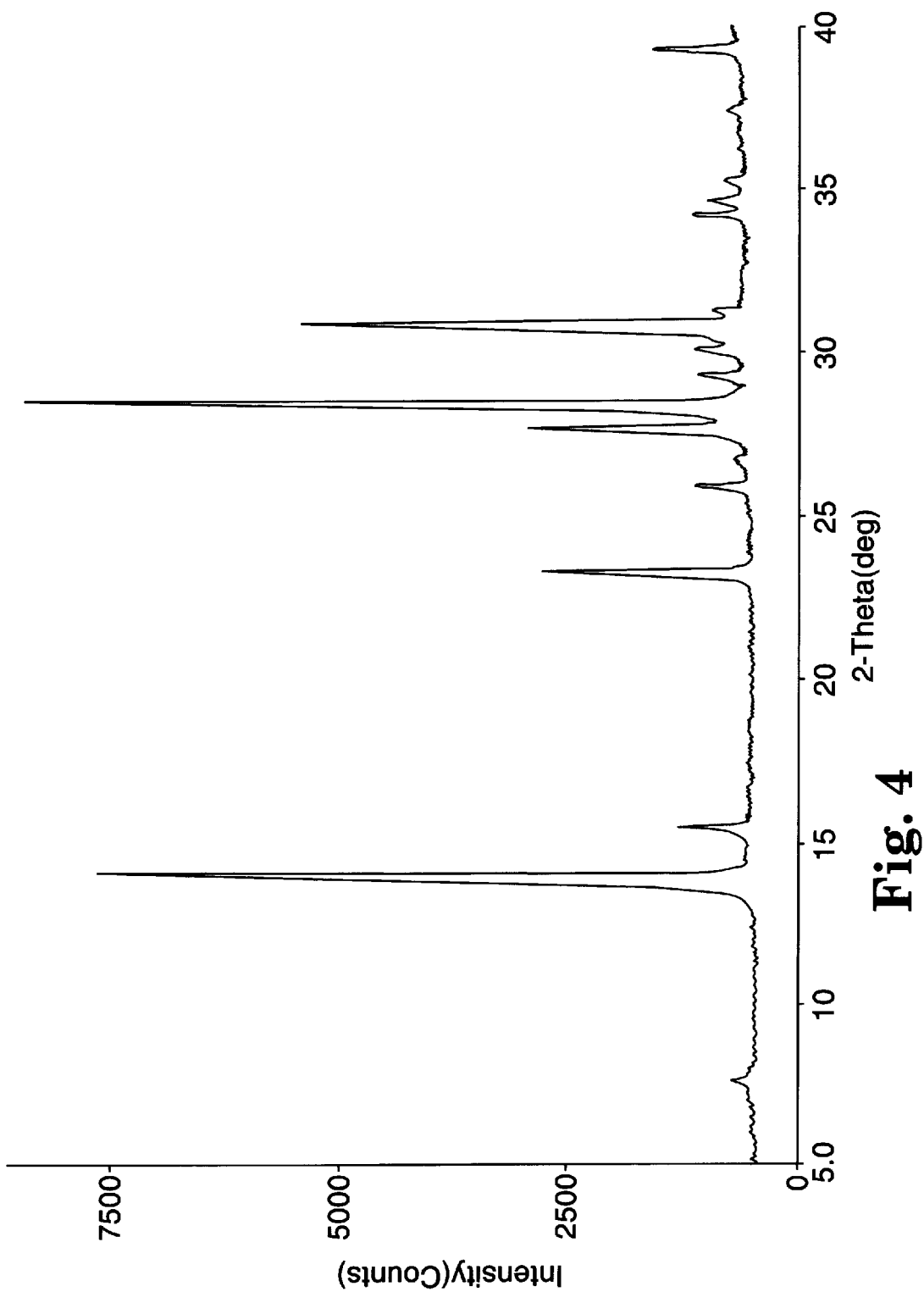
FIG. 4 is an XRD pattern of lithium vanadium oxide made according to a method of the present invention.

This example demonstrates blending carbon and the $Li_xV_3O_8$, which was made by the jet milling method, in a liquid media. Lithium hydroxide monohydrate (FMC) and vanadium pentoxide (Kerr-McGee) were processed in the eight quart PK blender and jet milled as in Example 1. This material was then heated in the oven as in Example 1. After cooling, samples were analysed. The results are summarized in FIG. 4 and Table 1. As can be seen by x-ray diffraction the only phase present was $Li_xV_3O_8$, wherein x=1.2.

A sample of 37.5 grams of the $Li_xV_3O_8$ powder was mixed in an Eiger Mill (Eiger Machinery, Model MK11 M100 VSE EXP, Chicago, Ill.) with 1.8 grams KETJEN-BLACK EC600JD carbon black (Akzo Nobel)) and 350 ml HPLC-grade heptane. The heptane was added to the Eiger mill first along with 40 grams of 1 mm milling media (TORAYCERAM Media, Nagase America, New York, N.Y.). The mixer was set to 2000 revolutions per minute (rpm) and the $Li_xV_3O_8$ powder was added very slowly over a 5 minute period. During this operation, the Eiger mill speed was increased to 3000 rpm and an additional 150 ml of HPLC-grade heptane was added. The KETJENBLACK EC600JD carbon black (Akzo Nobel) was then added, the speed was increased to 4000 rpm and mixing was continued at 4000 rpm for 45 minutes. The milled solution was filtered and the filter cake was vacuum dried at 30 mm Hg (40 kPa) for 24 hours at 120° C., under helium purge. This blend of carbon and $Li_xV_3O_8$ was then used to produce and test a battery lab cell according to the procedure outlined under CELL PREPARATION AND CYCLING. The $Li_xV_3O_8$ prepared in this example provided 258 mAh/gram.

Example 4

Figure 5:
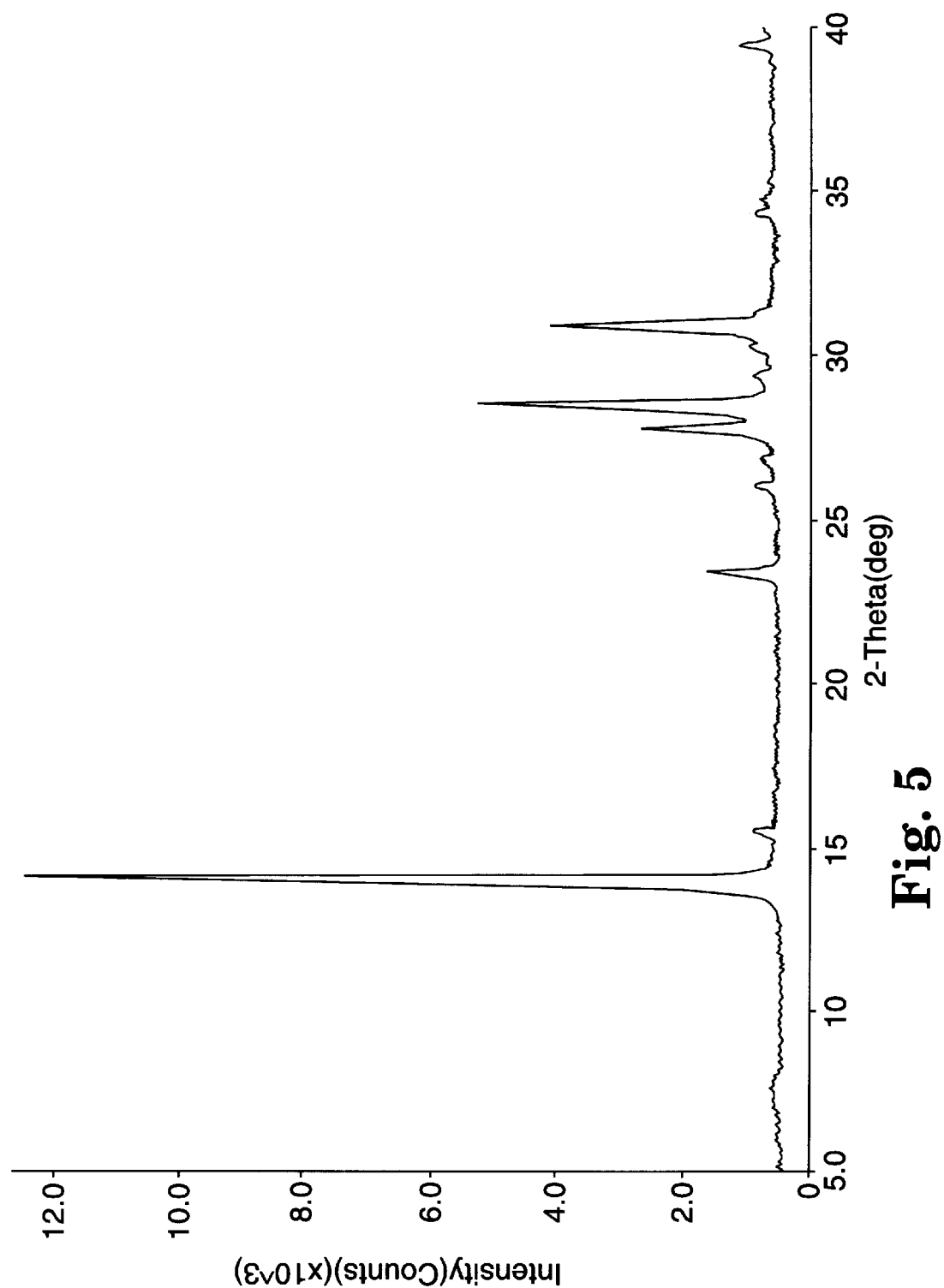
FIG. 5 is an XRD pattern of lithium vanadium oxide made according to a method of the present invention.

This example demonstrates blending carbon and the $Li_xV_3O_8$, which was made by the jet milling method, in liquid media. Lithium hydroxide monohydrate and ammonium metavanadate were processed in a sixteen quart PK blender and then jet milled as in Example 2. This material was then calcined in the oven as in Example 2. After cooling, samples were analysed. The results are summarized in FIG. 5 and Table 1. As can be seen by x-ray diffraction the only phase present was $Li_xV_3O_8$, wherein x=1.2.

A sample of 37.5 grams of the $Li_xV_3O_8$ powder was mixed in an Eiger Mill (Eiger Machinery, Model MK11 M100 VSE EXP, Chicago, Ill.) with 1.8 grams KETJENBLACK EC600JD carbon black (Akzo Nobel)) and 350 ml HPLC-grade heptane. The heptane was added to the Eiger mill first along with 40 grams of 1 mm milling media (TORAYCERAM Media). The mixer was set to 2000 rpm and the oxide powder added very slowly over about 5 minutes as the rpm was increased to 3000 rpm and an additional 150 ml of HPLC-grade heptane was added. Good flow (i.e., a constant stream of material) in the Eiger mill was also verified by visual inspection. The KETJENBLACK EC600JD carbon black (Akzo Nobel) was then added, the speed was increased to 4000 rpm and mixing was continued at 4000 rpm for 45 minutes. The milled solution was filtered and the filter cake was dried under a vacuum of 30 mm Hg (40 kPa) for 24 hours at 120° C. under helium purge. This blend of carbon and $Li_xV_3O_8$ was used to produce and test a battery lab cell according to the procedure outlined under CELL PREPARATION AND CYCLING. The $Li_xV_3O_8$ prepared in this example provided 284 mAh/gram.

Example 5 (Comparative)

Figure 6:
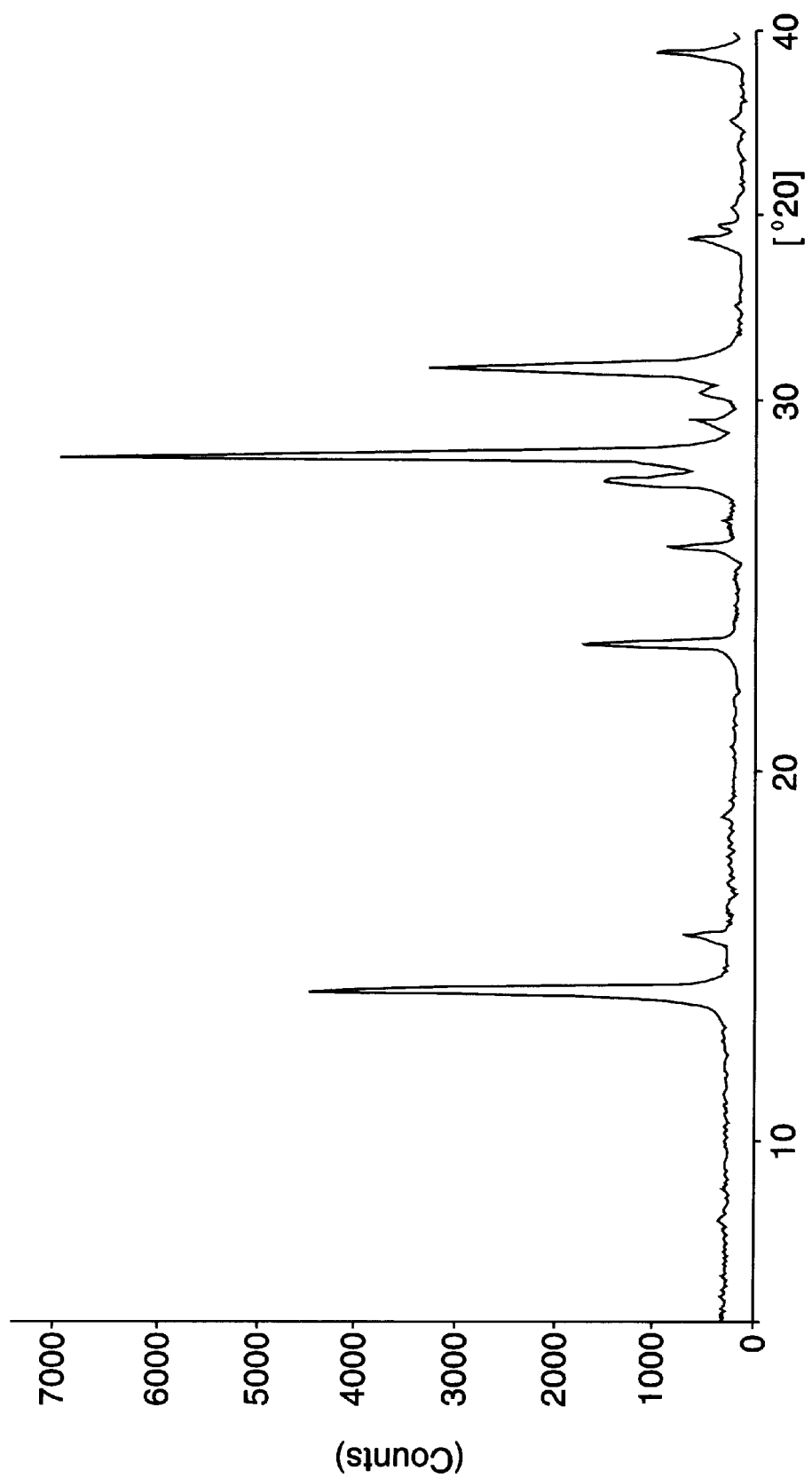
FIG. 6 is an XRD pattern of lithium vanadium oxide made according to a method of the present invention.

This example demonstrates using a liquid media for blending the lithium hydroxide and ammonium metavanadate during the preparation of lithium vanadium oxide. A sample of 2000 grams of 13 mm milling media (TORAYCERAM Media) was placed in a fifteen liter polyethylene carboy. To this was added 4000 grams of HPLC-grade methanol and 1224 grams lithium hydroxide monohydrate (FMC). The lid was attached and the carboy agitated gently by hand. Pressure due to heat of solution was carefully released and the container was allowed to stand a minimum of 10 minutes. A sample of 8356 grams of ammonium metavanadate (Kerr-McGee) was added, the carboy was sealed, agitated gently and the pressure was released. After resealing, the carboy was placed on a jar mill (US Stoneware Model 803DVM 115 ball mill, East Palistine, Ohio) and rolled at 60 rpm for 48 hours. The slurry was removed and separated from the grinding media. The slurry was charged to a 20 liter round bottom flask on a Buchi Rotovap R-153 with a Lauda WK-3200 chiller and a water bath temperature controller. The residual methanol was removed at 50° C. with the vacubox set to 40 mbar (4 kPa). The dried material was placed into a polyethylene bag, purged with $CO_2$, and sealed. This material was added to a sixteen quart PK blender and blended for 10 minutes. The dried material was placed in a high temperature oven with exhaust. The material was heated at 3° C./minute from 25° C. to 285° C., kept at 285° C. for 9 hours and 20 minutes, heated at 0.5° C./minute from 285° C. to 395° C., kept at 395° C. for 7 hours, cooled at 6° C./minute from 395° C. to 25° C. This material was hammer milled (Fitzmill Model DOSO6 Hammer Mill with 3.5 centimeter punched screen, Fitzpatrick Mills, Elmhurst, Ill.) by Aveka, Inc., Woodbury, Minn. A portion of this material was sampled for X-ray diffraction (Philips Vertical Diffractometer Model XRG3100, copper $K_\alpha$, radiation for 2-theta from 5 degrees to 40 degrees in steps of 0.04 degree and a preset time of 4 seconds, and proportional detector registry of the scattered radiation, Philips, Mahwah, N.J.) and particle size determination. The XRD scan is shown in FIG. 6. The particle size results are summarized in Table 1.

A sample of 1900 grams of the hammer milled oxide and 100 grams of KETJENBLACK EC600JD carbon black (Akzo Nobel) were blended for 30 minutes in an eight quart PK blender. This blend of carbon and lithium vanadium oxide was then vacuum dried at 30 mm Hg (40 kPa) for 24 hours at 120° C., under helium purge. This blend of carbon and $Li_xV_3O_8$ was then used to produce and test a battery lab cell according to the procedure outlined under CELL PREPARATION AND CYCLING. The $Li_xV_3O_8$ prepared in this sample provided 266 mAh/gram.

TABLE 1

Particle Size Determination

| Example No. | % < 1 micron particle size | % > 10 microns particle size | Mean particle size | Particle size Stand. Dev. |
|---|---|---|---|---|
| 1 (jet milled with carbon after calcining) | 69 | 0.0 | 0.8 | 0.4 |
| 2 (jet milled after calcining) | 63 | 0.0 | 1.0 | 0.7 |
| 3 (no subsequent jet milling) | 35 | 0.4 | 2.0 | 1.8 |
| 4 (no subsequent jet milling) | 16 | 14 | 5.5 | 4.6 |
| 5 (Comp.) | 40 | 26 | 6.3 | 7.6 |

Example 6

This example demonstrates that two materials can be fed directly into a jet mill in the appropriate amounts without preblending. Specifically, this example demonstrates feeding the vanadium pentoxide and lithium hydroxide monohydrate into the jet mill together at the correct stoichiometry to provide a truly continuous method. A four feeder system was installed onto the jet mill described in Example 1. This system consisted of two AccuRate Dry Material Feeders (Model 302) for refilling, and two AccuRate Feeders (Model 302) with AccuRate Counterbalance Scales (Model 3000). These feeders were controlled by an AccuRate Loss-In-Weight Controller System (Model 8002L). All of this equipment was obtained from AccuRate, Whitewater, Wis. The feed used for vanadium pentoxide (Stratcor, Hot Springs, Ariz.) in the main feeder was 70 grams per minute and for the lithium hydroxide monohydrate (FMC) was 12.88 grams per minute. The manifold and pusher nozzle were both set at 120 psi (0.83 Mpa). The product was collected with a filter bag house. This material was then calcined in the Blue M oven as in Example 1. After cooling, samples were analyzed. The XRD is shown in FIG. 7.

Example 7

Samples of 8356 grams of ammonium metavanadate (Kerr-McGee) and 1224 grams of lithium hydroxide (FMC) were added to a sixteen quart PK blender described in Example 1 and blended for 10 minutes. This material was then fed into a jet mill (Fluid Energy Model 8 MICRO-JET) at 2 kg/hr through a dry feeder. The manifold and pusher nozzle were both set at 120 psi (0.83 MPa). The product was collected with a filter bag house. The precursor material was then fed into a flash calciner (Fluid Energy Aljet Model 4 THERMAJET) using heated air at inlet temperatures ranging from 426° C. to 648° C. and outlet temperatures of 400° C. to 550° C. (gas temperatures). Feed rates used were 9 kg/hr to 22 kg/hr. The product was collected with a cyclone. After calcining the material was submitted for XRD. The data is shown in Table 2. From XRD results the material was not completely converted to single-phase $Li_xV_3O_8$, wherein x=1.2. Samples from each condition were placed in a box furnace at 450° C. for 8 hours. The refired material was submitted for XRD. XRD results showed the material had converted to single-phase $Li_xV_3O_8$, wherein x=1.2 or acceptable levels of other phases were present. The XRD results are shown in Table 2.

TABLE 2

X-Ray Diffraction Results

| Sample ID | $Li_xV_3O_8$ (x – 1.2) Phase Intensity % | Beta $Li_{0.3}V_2O_5$ Phase Intensity % | $LiVO_3$ Phase Intensity % | $V_2O_5$ Phase Intensity % |
|---|---|---|---|---|
| 1 | 100 | 23.6 | 5.2 | Not Detected |
| 2 | 100 | 30.6 | 14.9 | 20.4 |
| 3 | 100 | 28.5 | 7.4 | 2.9 |
| 4 | 100 | 30.3 | 25.7 | 58.3 |
| 1 Refire | 100 | Not Detected | Not Detected | Not Detected |
| 2 Refire | 100 | Not Detected | 0.9 | Not Detected |
| 3 Refire | 100 | Not Detected | Not Detected | Not Detected |
| 4 Refire | 100 | 0.6 | 1.6 | Not Detected |

Laboratory Cell Preparation and Cycling

Electrolyte solution was prepared by mixing 54.55 grams of a copolymer containing ethylene oxide as described in U.S. Pat. No. 5,755,985 (Vallee et al.), 11.60 grams lithium bis-trifluoromethanesulfonylimide (3M Co., St. Paul, Minn.), 0.25 gram SANTANOX TBMC antioxidant (Aldrich Chemical Co., Milwaukee, Wis.), 314.5 grams anhydrous acetonitrile, and 86.5 grams anhydrous toluene. This mixture was placed in a quart jar, sealed, and rolled slowly on a jar mill (US Stoneware Model 803DVM 115) for 8 hours.

A cathode coating solution was prepared by adding 750 grams of 15 mm milling media (TORAYCERAM Media), 38.5 grams of the blend of carbon and $Li_xV_3O_8$ powder, 144 grams of electrolyte solution, and 1% HYPERMER LP4 surfactant (now sold as ZEPHRYM PD-4000 from ICI Surfactants, New Castle, Del.) to a clean, baffled, 500 mL polyethylene container. This was sealed and the polyethylene container was then placed into a core tube and rolled at 60–65 rpm for 48 hours on a roller mill. In a dry room, the cathode coating solution was spread with a notch bar coater onto a carbon coated aluminum current collector, the solvent was removed from the coating by heating at 140° C. for two minutes, to produce a 75.5 grams/square meter coating. Samples of the coating were transferred to a controlled atmosphere glove box (dew point less than −90° C., less than 2 ppm oxygen) and conditioned in a vacuum chamber (40 kPa) at 100° C. for one hour. The cathode coating was used to prepare a lithium polymer battery.

A one inch diameter sample of cathode coating was die cut and laminated under vacuum of 40 kPa and a pressure of 4.24 kPa at 80° C. for 15 minutes to a solid polymeric electrolyte layer which has been affixed to one side of a lithium metal anode as described in U.S. Pat. No. 4,897,917 (Gauthier et al.). The electrochemically active area was defined by a circular mask of polypropylene placed between the cathode and the solid polymeric electrolyte layer. The laminated structure was heat sealed between two brass shims using a hot melt adhesive. The sealing process provides for protection from ambient atmosphere and for electric contacts necessary for the electrochemical evolution. At 80° C. and 75 psi (0.52 MPa) pressure, the electrochemical cell was discharged at 1.3 milliAmps/cm$^2$ from 3.1 volts to 2.2 volts.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of preparing lithium vanadium oxide for use as an electrode material, the method comprising:
   admixing a particulate form of a lithium compound and a particulate form of a vanadium compound;
   jet milling the particulate admixture of the lithium and vanadium compounds; and
   heating the jet milled particulate admixture at a temperature below the melting temperature of the admixture to form lithium vanadium oxide.

2. The method of claim 1 wherein the step of jet milling comprises reducing the particle size of the particulate admixture.

3. The method of claim 1 wherein the steps of admixing and jet milling occur in one step.

4. The method of claim 1 wherein the mean particle size of the lithium vanadium oxide is no greater than about 5 microns.

5. The method of claim 4 wherein the mean particle size of lithium vanadium oxide is no greater than about 1 micron.

6. The method of claim 1 wherein the particle size distribution of the lithium vanadium oxide has an upper level of no greater than about 10 microns.

7. The method of claim 1 wherein the step of admixing comprises admixing two or more lithium salts.

8. The method of claim 1 wherein the step of admixing comprises admixing two or more vanadium oxides.

9. The method of claim 1 wherein the lithium vanadium oxide is of the formula $Li_xV_3O_8$, wherein x=1.0–1.5.

10. The method of claim 9 wherein the lithium vanadium oxide is single-phase $Li_xV_3O_8$, wherein x=1.0–1.5.

11. The method of claim 10 wherein the lithium vanadium oxide is of the formula $Li_{1.2}V_3O_8$.

12. The method of claim 1 further comprising jet milling the lithium vanadium oxide produced in the heating step.

13. The method of claim 12 wherein the mean particle size of lithium vanadium oxide is no greater than about 1 micron.

14. The method of claim 12 wherein the heating step is carried out at a temperature of no greater than about 630° C.

15. The method of claim 14 wherein the heating step is carried out at a temperature of no greater than about 550° C.

16. The method of claim 1 wherein the heating step is carried out for a time sufficient to form substantially single-phase lithium vanadium oxide.

17. The method of claim 1 wherein the heating step takes place in an oxidizing atmosphere.

18. The method of claim 1 wherein the heating step is carried out in a flash calciner.

19. The method of claim 1 wherein the lithium compound and vanadium compound are admixed in a ratio sufficient to form substantially single-phase lithium vanadium oxide.

20. The method of claim 1 wherein the lithium compound and vanadium compound are admixed in a molar ratio of lithium to vanadium of about 1.0:3.0 to about 1.5:3.0.

21. The method of claim 1 wherein the lithium compound is selected from the group of lithium oxide, lithium hydroxide, lithium carbonate, lithium nitrate, lithium acetate, lithium stearate, lithium formate, lithium oxalate, lithium citrate, lithium lactate, lithium tartrate, lithium pyruvate, and mixtures thereof.

22. The method of claim 21 wherein the lithium compound is selected from the group of lithium hydroxide, lithium carbonate, and combinations thereof.

23. The method of claim 22 wherein the lithium compound is lithium hydroxide.

24. The method of claim 1 wherein the vanadium compound comprises vanadium in the +5 oxidation state.

25. The method of claim 1 wherein the vanadium compound is selected from the group of vanadium pentoxide, vanadium tetroxide, vanadium trioxide, ammonium metavanadate, and mixtures thereof.

26. The method of claim 25 wherein the vanadium oxide is selected from the group of vanadium pentoxide, ammonium metavanadate, and combinations thereof.

27. A method of making an electrochemical cell, the method comprising preparing a cathode comprising:

providing lithium vanadium oxide;

admixing the lithium vanadium oxide in particulate form with a particulate form of an electronically conductive material;

jet milling the particulate admixture of lithium vanadium oxide and electronically conductive material;

combining the jet milled particulate admixture with a binder and forming a cathode; and combining the cathode with an electrolyte and an anode comprising a lithium-containing material to form an electrochemical cell.

28. The method of claim 27 wherein the steps of admixing and jet milling occur in one step.

29. The method of claim 27 wherein the step of providing lithium vanadium oxide comprises:

admixing a particulate form of a lithium compound and a particulate form of a vanadium compound; and heating the particulate admixture for a time and at a temperature effective to form lithium vanadium oxide.

30. The method of claim 29 further comprising a step of jet milling the particulate admixture of lithium and vanadium compounds prior to the step of heating.

31. The method of claim 27 wherein the electrolyte is a solid electrolyte.

32. The method of claim 31 wherein the solid electrolyte is an ionically conducting polymer.

33. The method of claim 27 wherein the electronically conductive material comprises carbon black.

34. The method of claim 27 wherein the anode comprises a lithium-containing material selected from the group of metallic lithium, lithium metal alloys, and lithium metal oxides.

35. A method of preparing lithium vanadium oxide for use as an electrode material, the method comprising:

admixing a particulate form of a lithium compound and a particulate form of a vanadium compound; and heating the particulate admixture in a flash calciner.

* * * * *